United States Patent
Zheng et al.

(10) Patent No.: US 8,724,881 B2
(45) Date of Patent: May 13, 2014

(54) METHOD AND SYSTEM FOR PRECISE SEGMENTATION OF THE LEFT ATRIUM IN C-ARM COMPUTED TOMOGRAPHY VOLUMES

(71) Applicant: Siemens Corporation, Iselin, NJ (US)

(72) Inventors: Yefeng Zheng, Dayton, NJ (US); Matthias John, Nuremberg (DE); Gareth Funka-Lea, Cranbury, NJ (US); Jan Boese, Eckental (DE); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 34 days.

(21) Appl. No.: 13/670,505

(22) Filed: Nov. 7, 2012

(65) Prior Publication Data

US 2013/0129170 A1    May 23, 2013

Related U.S. Application Data

(60) Provisional application No. 61/557,449, filed on Nov. 9, 2011.

(51) Int. Cl.
*G06K 9/00* (2006.01)

(52) U.S. Cl.
USPC .......................................... 382/131

(58) Field of Classification Search
None
See application file for complete search history.

(56) References Cited

U.S. PATENT DOCUMENTS

| 7,565,190 B2 * | 7/2009 | Okerlund et al. ............. 600/426 |
| 7,957,572 B2 * | 6/2011 | Von Berg et al. ............. 382/128 |
| 8,422,753 B2 * | 4/2013 | Zheng et al. ................. 382/128 |
| 2011/0096964 A1 * | 4/2011 | Zheng et al. ............... 382/128 |
| 2012/0026169 A1 | 2/2012 | Bernhardt et al. |

* cited by examiner

*Primary Examiner* — Jason M Repko
*Assistant Examiner* — Shervin Nakhjavan
(74) *Attorney, Agent, or Firm* — Michele L. Conover

(57) ABSTRACT

A method and system for multi-part left atrium (LA) segmentation in a C-arm CT volume is disclosed. Multiple LA part models, including an LA chamber body mesh, an appendage mesh, a left inferior pulmonary vein (PV) mesh, a left superior PV mesh, a right inferior PV mesh, and a right superior PV mesh, are segmented in a 3D volume. A volume mask is generated from the LA chamber mesh, the appendage mesh, and the PV meshes. Erosion is performed in the LA chamber body and a plurality of ostia regions in the volume mask. The plurality of ostia regions in the volume mask are refined using region growing, and a smooth mesh is fit to each ostia region. A consolidated LA mesh is generated from the volume mask and the parts of the LA mesh are relabeled in the ostia region based on part boundaries detected using an optimization approach.

28 Claims, 11 Drawing Sheets

METHOD AND SYSTEM FOR PRECISE SEGMENTATION OF THE LEFT ATRIUM IN C-ARM COMPUTED TOMOGRAPHY VOLUMES

This application claims the benefit of U.S. Provisional Application No. 61/557,449, filed Nov. 9, 2011, the disclosure of which is herein incorporated by reference.

BACKGROUND OF THE INVENTION

The present invention relates to cardiac imaging, and more particularly, to left atrium segmentation in C-arm computed tomography (CT) images.

Strokes are the third leading cause of death in the United States. Approximately fifteen percent of all strokes are caused by atrial fibrillation (AF). As a widely used minimally invasive surgery to treat AF, a catheter based ablation procedure uses high radio-frequency energy to eliminate sources of ectopic foci, especially around the ostia of the appendage and the pulmonary veins (PV). Automatic segmentation of the left atrium (LA) is important for pre-operative assessment to identify the potential sources of electric events. However, there are large variations in PV drainage patterns between different patients. For example, the most common variations, which are found in 20-30% of the population, are extra right PVs and left common PVs (where two left PVs merge into one before joining the chamber).

Conventional LA segmentation methods can be roughly categorized as non-model based or model-based approaches. The non-model based approaches do not assume any prior knowledge of the LA shape and the whole segmentation procedure is purely data driven. An advantage of non-model based methods is that they can handle structural variations of the PVs. However, such methods cannot provide the underlying anatomical information (e.g., which part of the segmentation is the left inferior PV). In practice non-model based approaches work well on computed tomography (CT) or magnetic resonance imaging (MRI) data, but such methods are typically not robust on challenging C-arm CT images. Model based approaches exploit a prior shape of the LA (either in the form of an atlas or a mean shape mesh) to guide the segmentation. Using a prior shape constraint typically allows model based approaches to avoid leakage around weak or missing boundaries, which plagues non-model based approaches. However, using one mean shape, it is difficult to handle structural variations (e.g., the left common PV). In order to address PV variations, multiple atlases are required, which costs extra computation time.

BRIEF SUMMARY OF THE INVENTION

The present invention provides a method and system for automatically segmenting the left atrium (LA) in C-arm CT image data. Embodiments of the present invention utilize a part based LA model including the chamber, appendage, and four major pulmonary veins (PVs). Embodiments of the present invention use a model based approach to segment the LA parts and enforce a statistical shape constraint during estimation of pose parameters of the different parts. Embodiments of the present invention further provide precise segmentation around the PV ostia regions by enforcing both image boundary delineation accuracy and mesh smoothness in the boundary region.

In one embodiment of the present invention, An LA chamber body mesh, an appendage mesh, and a plurality of pulmonary vein (PV) meshes are segmented in a 3D volume. A volume mask is generated from the LA chamber mesh, the appendage mesh, and the plurality of PV meshes. Each of a plurality of ostia regions in the volume mask is refined using region growing. The plurality of ostia regions include an appendage ostia region and a plurality of PV ostia regions. A smooth mesh is fit to each of the plurality of ostia regions. A consolidated LA mesh from the volume mask including the smooth mesh fit to each of the plurality of ostia regions.

These and other advantages of the invention will be apparent to those of ordinary skill in the art by reference to the following detailed description and the accompanying drawings.

DETAILED DESCRIPTION

Figure 1:
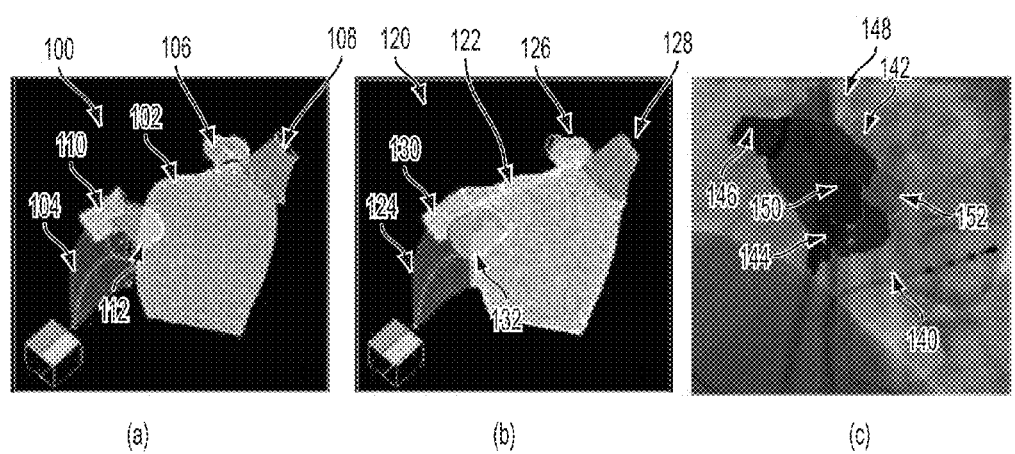
FIG. 1 illustrates a part-based left atrium model according to an embodiment of the present invention.

The present invention is directed to a method and system for fully automatic segmentation of the left atrium (LA) in C-arm CT image data. Embodiments of the present invention are described herein to give a visual understanding of the LA segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Embodiments of the present invention provide fully automatic LA segmentation in C-arm CT data. Compared to conventional CT or MRI, an advantage of C-arm CT is that overlay of the 3D patient-specific LA model onto a 2D fluoroscopic image is straightforward and accurate since both the 3D and 2D images are captured on the same device within a short time interval. Typically, a non-electrocardiography-gated acquisition is performed to reconstruct a C-arm CT volume. Accordingly, the C-arm CT volume often contains severe motion artifacts. For a C-arm image acquisition device with a small X-ray detector panel, part of a patient's body may be missing in some 2D X-ray projections due to the limited field of view, resulting in significant artifacts around the margin of a reconstructed volume. In addition, there may be severe streak artifacts caused by various catheters inserted in the heart. These challenges are addressed herein using a model based approach for LA segmentation, which also takes advantage of a machine learning based object pose detector and boundary detector.

United States Published Patent Application No. 2012/0230570, filed Mar. 9, 2012 and entitled "Method and System for Multi-Part Left Atrium Segmentation in C-Arm Computed Tomography Volumes Using Shape Constraints", which is incorporated herein by reference, describes a fully automatic part based LA segmentation method for C-arm CT. Instead of using one mean model, the challenge of pulmonary vein (PV) structural variations is addressed using a part based model, where the whole LA is split into the chamber, appendage, and four major PVs. Each part is a much simpler anatomical structure compared to the holistic LA structure. Although each part is segmented well, the connection region to the LA chamber (i.e., the region around the ostia of the PVs and appendage) may not be segmented accurately. In atrial fibrillation ablation, tissues surrounding the PV ostia are the main focus of ablation. Therefore, the segmentation accuracy around the PV ostia is very important. The present inventors have observed the following limitations in the part based LA segmentation method of United States Published Patent Application No. 2012/0230570. The ridge between the left superior PV (LSPV) and the appendage is often not delineated accurately. For patients with a narrow LSPV-appendage ridge, the LA chamber mesh tends to enclose the proximal part of the ridge. Also, the regions around the PV ostia are typically not segmented accurately. This problem manifests especially for the left common PVs due to the large gap between the LA chamber mesh and the left inferior and superior PV meshes. Simple region growing is no accurate enough to segment the ostia region because insufficient image quality of C-arm CT. In addition, the mesh is often not labeled accurately around the ostia region since the whole ostia region is labeled as part of the chamber.

Embodiments of the present invention provide a method for precise segmentation if the ostia regions by enforcing both image boundary delineation accuracy and mesh smoothness. Embodiments of the present invention convert a mesh representation to a volume mask, where the label of each voxel in the volume mask represents one of six parts. The ostia region is then labeled by projecting the proximal ring of a PV or the appendage onto the LA chamber mesh. The region between the proximal rings before and after projection is the initial estimate of the ostia region. To achieve more precise delineation of the LSPV-appendage ridge, layer-by-layer erosion to the mask is performed. An adaptive erosion threshold can be automatically determined based on the intensity histogram of the ostia region, in order to handle large intensity variations across datasets. After mask erosion, layer-by-layer region growing is performed to enclose the neighboring bright voxels (again using an adaptive threshold). Due to low image quality of a C-arm CT volume, the thin boundary between the LA and surrounding tissues is often hardly visible, which can cause leakage of region growing. Another issue is that the extracted boundary may not be smooth due to strong intensity noise and artifacts. To fix these issues, embodiments of the present invention fit a smooth mesh to each ostia region. After excluding the ostia region voxels outside of all fitted meshes, the final consolidated mesh is generated from the volume mask, for example using the marching-cubes algorithm.

Embodiments of the present invention also provide a method for improving the precision of the labeling of the mesh parts by determining the exact boundary between the appendage/PVs and the LA chamber. The interface between different parts usually forms a crease, resulting in high surface curvature. However, high curvature is not the only hint for the part boundary since a smooth connection is also common. Embodiments of the present invention provide a method to search for an optimal part boundary with both high curvature and boundary smoothness.

FIG. 1 illustrates a part-based LA model according to an embodiment of the present invention. As shown in image (a) of FIG. 1, the part-based LA model 100 includes the LA chamber body 102, appendage 104, and four major PVs 106, 108, 110, and 112. The four major PVs are the left inferior PV 112, the left superior PV 110, the right inferior PV 108, and the right superior PV 106. The shape of the appendage 104 is close to a tilted cone and the PVs 106, 108, 110, and 112 each have a tubular structure. Since, for atrial fibrillation (AF) ablation, physicians typically only care about a proximal PV trunk, the each PV model 106, 108, 110, and 112 only detects a trunk of 20 mm in length originating from its respective ostium. Each LA part 102, 104, 106, 108, 110, and 112 is a much simpler anatomical structure as compared to a holistic LA structure, and therefore can be detected and segmented using a model based approach. Once the LA parts are segmented in a C-arm CT volume, they are combined into a consolidated mesh model. Image (b) of FIG. 1 shows a consolidated LA mesh 120 including the LA chamber 122, appendage 124, and PVs 126, 128, 130, and 132. Image (c) of FIG. 1 shows the overlay of a consolidated LA mesh 140 including the LA chamber 142, appendage 144, and PVs 146, 148, 150, and 152 on a 2D fluoroscopic image.

Figure 2:
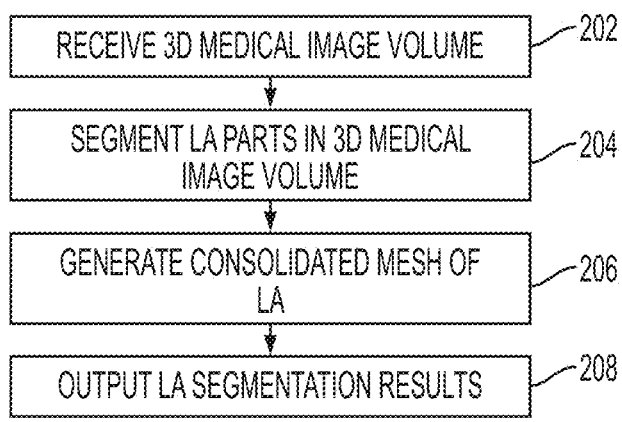
FIG. 2 illustrates a method for part-based segmentation of the left atrium according to an embodiment of the present invention.

FIG. 2 illustrates a method for part-based segmentation of the LA according to an embodiment of the present invention. As illustrated in FIG. 2, at step 202, a 3D medical image volume is received. In an advantageous embodiment, the 3D medical image volume is a C-arm CT volume, but the present invention is not limited thereto and may be similarly applied to other types of 3D volumes, such as conventional CT and MRI volumes, as well. The 3D medical image volume may be received directly from an image acquisition device, such as a C-arm image acquisition device. It is also possible that the 3D medical image volume is received by loading a 3D medical image volume stored on a storage or memory of a computer system.

At step 204, the LA parts are segmented in the 3D medical image volume. In particular, the LA chamber body, appendage, left inferior PV, left superior PV, right inferior PV, and right superior PV are segmented in the 3D medical image volume, resulting in a patient-specific mesh for each of the parts. Marginal Space Learning (MSL) can be used to segment each of the LA chamber mesh, the appendage mesh, and the PV meshes in the 3D volume.

MSL is used to estimate the position, orientation, and scale of an object in a 3D volume using a series of detectors trained using annotated training data. In order to efficiently localize an object using MSL, parameter estimation is performed in a series of marginal spaces with increasing dimensionality. Accordingly, the idea of MSL is not to learn a classifier directly in the full similarity transformation space, but to incrementally learn classifiers in the series of marginal spaces. As the dimensionality increases, the valid space region becomes more restricted by previous marginal space classifiers. 3D object detection (object pose estimation) is split into three steps: object position estimation, position-orientation estimation, and position-orientation-scale estimation. A separate classifier is trained based on annotated training data for each of these steps. This object localization stage results in an estimated transformation (position, orientation, and scale) of the object, and a mean shape of the object is aligned with the 3D volume using the estimated transformation. After the object pose estimation, the boundary of the object is refined using a learning based boundary detector. MSL is described in greater detail in U.S. Pat. No. 7,916,919, issued Mar. 29, 2011, and entitled "System and Method for Segmenting Chambers of a Heart in a Three Dimensional Image", which is incorporated herein by reference.

For each LA part (chamber body, appendage, and each PV), an MSL based pose detector (including position, position-orientation, and position-orientation-scale detectors) and a learning based boundary detector are trained based on annotated training data. The trained detectors for each LA part can be used to segment a separate mesh for each LA part in the 3D volume. Compared to a holistic approach for LA segmentation, the part based approach can handle large structural variations. The MSL based segmentation works well for the LA chamber. However, independent detection of the other parts may not be robust, either due to low contrast (appendage) or small object size (PVs). Accordingly, an advantageous embodiment of the present invention, described in FIG. 3 below, uses constrained detection of the LA parts. In particular, the detection of the appendage and the PVs may be constrained by the LA chamber body.

Figure 3:
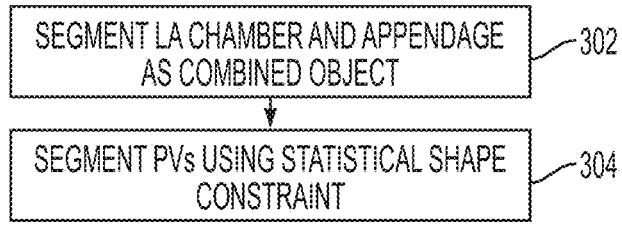
FIG. 3 illustrates a method of segmenting the left atrium parts in a 3D volume according to an embodiment of the present invention.

FIG. 3 illustrates a method of segmenting the LA parts in a 3D volume according to an embodiment of the present invention. FIG. 3 can advantageously be used to implement step 204 of FIG. 2. At step 302, the LA chamber body and the appendage are segmented as a combined object. In C-arm CT, the appendage is particularly difficult to detect. The appendage is a pouch without an outlet and the blood flow inside the appendage is slow, which may prevent the appendage frame filling with contrast agent. In many datasets, the appendage is only barely visible. The trained MSL detector for the appendage may detect the neighboring left superior PV, which often touches the appendage and has a higher contrast. However, the relative position of the appendage to the chamber is quite consistent. Accordingly, a more robust detection is achieved by segmenting the appendage mesh and the chamber mesh as a single object. In this case, one MSL based posed detector is trained to detect the combined object.

At step 304, the PVs are segmented using a statistical shape constraint. Through comparison experiments, the present inventors have determined that neither a holistic approach, nor independent detection was robust in detecting the four PVs. An advantageous embodiment of the present invention enforces a shape constraint in detection of the PVs. A point distribution model (PDM) is often used to enforce a statistical shape constraint among a set of landmarks. The total variation of the shape is decomposed into orthogonal deformation modes through principal component analysis (PCA). A deformed shape is projected into a low dimensional deformation subspace to enforce a statistical shape constraint.

Figure 4:
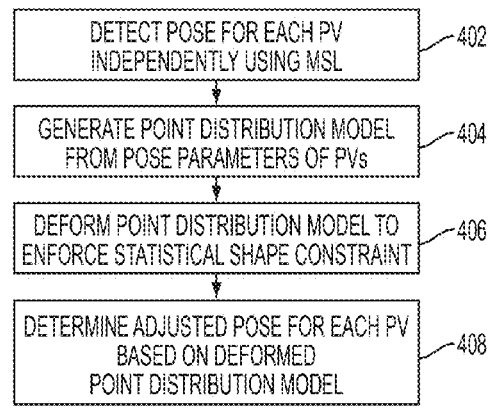
FIG. 4 illustrates a method for segmenting the pulmonary veins using a statistical shape constrained according to an embodiment of the present invention.

FIG. 4 illustrates a method for segmenting the PVs using a statistical shape constraint according to an embodiment of the present invention. The method of FIG. 4 can be used to implement step 304 of FIG. 3. At step 402, a pose for each PV is independently detected using MSL. In particular, for each PV (left inferior, left superior, right inferior, and right interior), a respective trained MSL detector estimates nine pose parameters: three position parameters ($T_x, T_y, T_z$), three orientation Euler angles ($O_x, O_y, O_z$), and three anisotropic scaling parameters ($S_x, S_y, S_z$).

At step 404, a point distribution model is generated from the estimated pose parameters of the PV. Different from the conventional PDM, which enforces a shape constraint on a set of landmark points, in this case the shape constraint must be enforced on the estimated orientation and size of each PV. One possible solution is to stack all of the PV pose parameters into a large vector to perform PCA. However, the position and orientation parameters are measured in different units. If not weighted properly, the extracted deformation modes may be dominated by one category of transformation. Furthermore, the Euler angles are periodic (with a period of $2\pi$), which prevents application of PCA.

An advantageous embodiment of the present invention utilizes a new representation of the pose parameters in order to avoid the above described problems. The object pose can be fully represented by the object center T together with three scaled orthogonal axes. Alternative to the Euler angles, the object orientation can be represented as a rotation matrix ($R_x, R_y, R_z$) and each column of R defines an axis. The object pose parameters can be fully represented by a four-point set ($T, V_x, V_y, V_z$), where:

$$V_x = T + S_x R_x, \; V_y = T + S_y R_y, \; V_z = T + S_z R_z. \quad (1)$$

Using the above representation, the pose of each PV is represented as a set of four points. The four points essentially represent a center point and three corner points of a bounding box defined by the pose parameters. In order to generate the PDM, the pose parameters estimated at step 402 for each of the four PVs are converted to the four-point representation. In addition to the four points for each of the PVs, the center points of the detected LA chamber and appendage are also added to the PDM in order to stabilize the detection. This results in a PDM having 18 points.

At step 406, the point distribution model is deformed to enforce a statistical shape constraint. An active shape model (ASM) is used to adjust the points representing the PV poses in order to enforce the statistical shape model. The statistical shape constraint is learned from PDMs constructed from the annotated LA parts (LA chamber, appendage, and PVs) in training volumes. The total variation of the shape is decomposed into orthogonal deformation modes through PCA. After the patient-specific PDM representing the poses of the PVs is generated, the patient-specific PDM is projected into a subspace with eight dimensions (which covers about 75% of the total variation) to enforce the statistical shape constraint.

At step 408, an adjusted pose is recovered for each of the PVs based on the deformed point distribution model. After enforcing the statistical shape constraint, the deformed four-point representation for a PV can be expressed as: ($\hat{T}, \hat{V}_x, \hat{V}_y, \hat{V}_z$). The adjusted PV center is given by point $\hat{T}$. The adjusted orientation $\hat{R}$ and scale $\hat{S}$ can be recovered by simple inversion of Equation (1). However, the estimate $\hat{R}$ is generally not a true rotation matrix $\hat{R}^T \hat{R} \neq I$. Accordingly, the adjusted rotation is determined by calculating the nearest rotation matrix $R_O$ to minimize the sum squares in elements in the difference matrix $R_O - \hat{R}$, which is equivalent to:

$$R_O = \min_R \text{Trace}((R - \hat{R})^T (R - \hat{R})), \quad (2)$$

subject to $R_O^T R_O = I$. Here, Trace(.) is the sum of the diagonal elements. The optimal solution to Equation (2) is given by:

$$R_O = \hat{R}(\hat{R}^T \hat{R})^{-1/2}. \quad (3)$$

This results in an adjusted pose for each of the four PVs. The adjusted pose for each PV can then be used to align the mean shape of each respective PV, and then the learning based boundary detector can be applied to each PV, as described above. Furthermore, in a possible implementation, the method of FIG. 4 can be applied iteratively to estimate the poses for the PV, where the adjusted poses for the PVs determined in step 408 in one iteration can be used to constrain a search region for the MSL-based detection of the PVs at step 402 in the next iteration. In this case, the method steps of FIG. 4 can be repeated until the PV poses converge or for a predetermined number of iterations.

Figure 5:
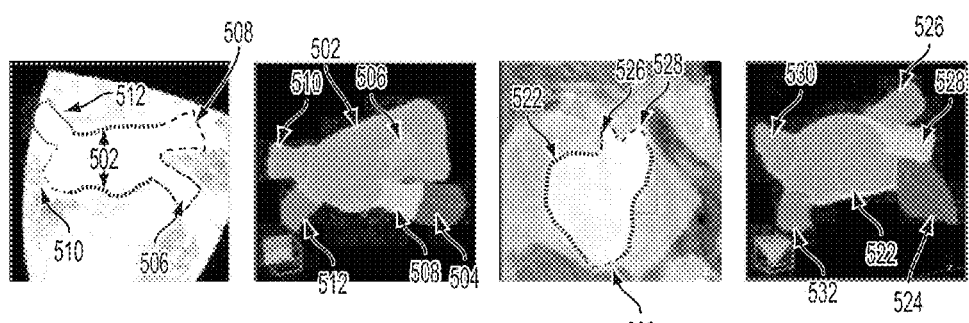
FIG. 5 illustrates exemplary left atrium chamber, appendage, and pulmonary vein segmentation results.

FIG. 5 illustrates exemplary LA chamber, appendage, and PV segmentation results. Images (a) and (b) of FIG. 5 show segmentation results for a patient with separate left inferior and superior PVs and images (c) and (d) show segmentation results for a patient with a left common PV. As shown in images (a) and (b), an LA chamber mesh 502, appendage mesh 504, left inferior PV mesh 506, left superior PV mesh 508, right inferior PV mesh 510, and right superior PV mesh 512 are successfully segmented for a patient with separate left inferior and superior PVs. As shown in images (c) and (d), an LA chamber mesh 522, appendage mesh 524, left inferior PV mesh 526, left superior PV mesh 528, right inferior PV mesh 530, and right superior PV mesh 532 are successfully segmented for a patient with a left common PV where the left inferior and superior PVs merge into one before joining the chamber.

Returning to FIG. 2, at step 206, a consolidated mesh of the LA is generated from the segmented meshes of the LA parts. The constrained detection and segmentation described above results in six meshes (the LA chamber mesh, appendage mesh, left inferior PV mesh, left superior PV mesh, right inferior PV mesh, and right superior PV mesh), as shown in image (a) of FIG. 1. There may be gaps and/or intersections among the different meshes. For use in AF ablation procedures, physicians likely prefer a consolidated mesh with different anatomical structures labeled with different structures.

Figure 6:
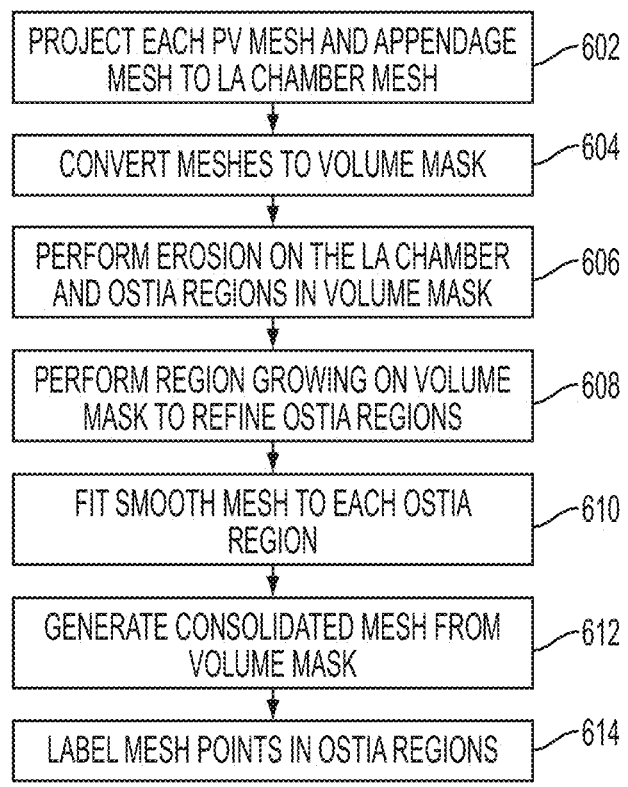
FIG. 6 illustrates a method for generating a consolidated mesh from the left atrium part meshes according to an embodiment of the present invention.
Figure 7:
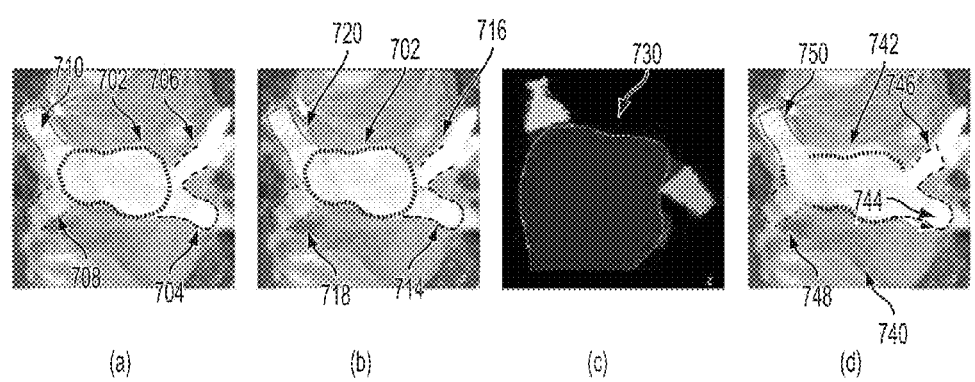
FIG. 7 illustrates exemplary results of the method steps of FIG. 6.

FIG. 6 illustrates a method for generating a consolidated mesh from the LA part meshes according to an embodiment of the present invention. The method of FIG. 6 can be used to implement step 206 of FIG. 2. As illustrated in FIG. 6, at step 602, each PV mesh and the appendage mesh are projected to the LA chamber mesh. In particular, the proximal ring (which is defined as the rim of a tubular mesh closest to the LA chamber) of each PV mesh and the appendage mesh is projected onto the LA chamber mesh along the centerline of the respective mesh in order to eliminate gaps between each PV mesh and the LA chamber mesh and gaps between the appendage mesh and the LA chamber mesh. This results in the meshes being fully connected. For each PV mesh and the appendage mesh, an initial estimate of a respective ostia region is provided by the region between the proximal ring before the projection and the proximal ring after it is projected to the LA chamber mesh. FIG. 7 illustrates exemplary results of the method steps of FIG. 6. Image (a) of FIG. 7 illustrates separate meshes segmented for the LA chamber 702 and PVs 704, 706, 708, and 710. Image (b) of FIG. 7 shows PV meshes 714, 716, 718, and 720 having added mesh pieces resulting from being projected to connect with the LA chamber mesh 702.

Returning to FIG. 6, at step 604, the connected meshes are converted to a volume mask. After step 602, the meshes are fully connected. However, mesh intersections may still be present; pieces of one or more of the PV meshes may lie inside the segmented LA chamber. Instead of working directly on the meshes to resolve such intersections, the meshes are converted to a volume mask. The volume mask is a binary mask in which all voxels inside the 3D meshes are considered "positive" and all voxels outside of are considered "negative". The volume mask can be generated by assigning all negative voxels an intensity of zero while leaving positive voxels at their original intensities. Referring to FIG. 7, image (c) shows a volume mask 730 generated from the meshes in image (b). As shown in image (d) of FIG. 7, a consolidated mesh 740 can be generated from the volume mask 730, for example using the well-known marching cubes algorithm. The consolidated mesh 740 provides a patient-specific segmentation of the LA chamber 742, appendage (not shown), left inferior PV 744, left superior PV 746, right inferior PV 748, and right superior PV 750. However, since a pure mesh operation is performed to connect the PV and appendage meshes to the LA chamber mesh, the ostia regions are not segmented accurately and need to be further refined. According to an advantageous embodiment of the present invention the refinement of the ostia regions is performed on the volume mask prior to generating the consolidated mesh.

Figure 8:
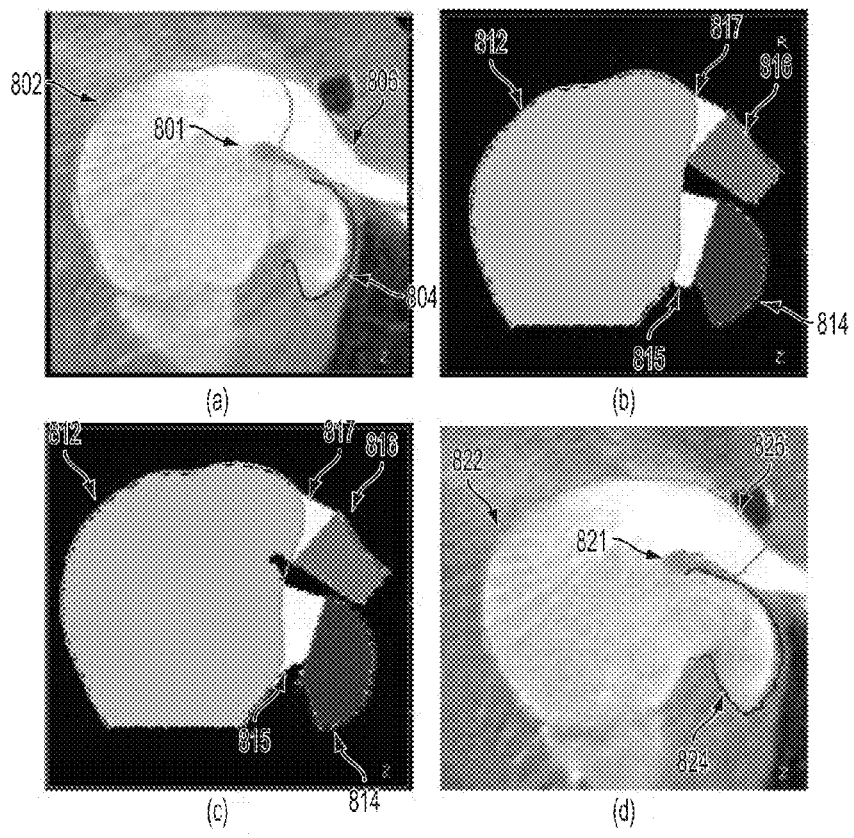
FIG. 8 illustrates refinement of the segmentation of the ridge between the left superior pulmonary vein and the appendage using mask erosion.

Returning to FIG. 6, at step 606, layer-by-layer erosion is performed on the LA chamber and ostia regions in the volume mask. The ridge between the left superior PV (LSPV) and the appendage is often not delineated accurately in the original volume mask, especially when the LSPV and the appendage are close to each other. FIG. 8 illustrates refinement of the segmentation of the ridge between the LSPV and the appendage using mask erosion. Image (a) of FIG. 8 shows a planar cut of a volume overlaid with the LA part meshes for the LA chamber 802, appendage 804, and LSPV 806. As shown in image (a) of FIG. 8, a narrow ridge 801 is partially enclosed inside the LA chamber mesh 802. To refine the segmentation around the ridge, layer-by-layer erosion is performed on the volume mask to remove dark voxels. In a possible implementation the erosion is performed on the LA chamber and ostia regions in the volume mask and the mask of the PVs and appendage is excluded from erosion since the model based segmentation typically gives accurate and satisfactory segmentation for the PVs and the appendage. The outer layer of the LA chamber and ostia regions is defined in the volume mask. If a voxel on the outer layer has an intensity less than a threshold, the voxel is set to a background voxel. The outer layer of the LA chamber and ostia regions in the volume mask is then redefined with the boundary of the LA chamber and ostia regions adjusted such that all background voxels are outside the boundary. The erosion can then be repeated on the redefined outer layer. Such layer-by-layer erosion is performed for a number iterations. For example, the layer-by-layer erosion may be performed for 10 iterations. Image (b) of FIG. 8 shows the volume mask including the LA chamber 812, appendage 814, and LSPV 816 regions, as well as ostia regions 815 and 817 respectively defined by connecting the appendage mesh 804 and the LSPV mesh 806 with the LA chamber mesh 802 prior to generating the volume mask. Image (c) of FIG. 8 shows the volume mask after erosion is performed on the LA chamber region 812 and the ostia regions 815 and 817 of the volume mask to remove dark voxels from the volume mask. Image (d) of FIG. 8 shows a final consolidated mesh, including the LA chamber 822, appendage 824, and LSPV 826, generated from the volume mask after erosion is performed. As shown in image (d), the ridge 802 is no longer enclosed by the LA chamber mesh 822.

This erosion operation not only improves the segmentation of the ridge between the LSPV and the appendage, but also improves the segmentation of other regions as well. For example, as shown in image (c) of FIG. 8, dark voxels in the ostia region 815 between the appendage 814 and the LA chamber 812 are removed, resulting in more accurate segmentation of that ostia region 815. A C-arm CT typically has a high intensity variation due to the lack of a standard protocol for the use of contrast agent. A fixed erosion threshold may not work for all datasets. Instead, according to an advantageous embodiment of the present invention, an adaptive threshold is automatically determined for each C-arm CT volume based on an analysis of the ostia region intensity. In particular, the intensity of the ostia regions in the volume is sorted into a histogram and the erosion threshold is automatically determines at a particular percentile of the intensity histogram. In a possible implementation, the lower 2.5th percentile of the intensity histogram of the ostia regions can be used as the erosion threshold.

Figure 9:
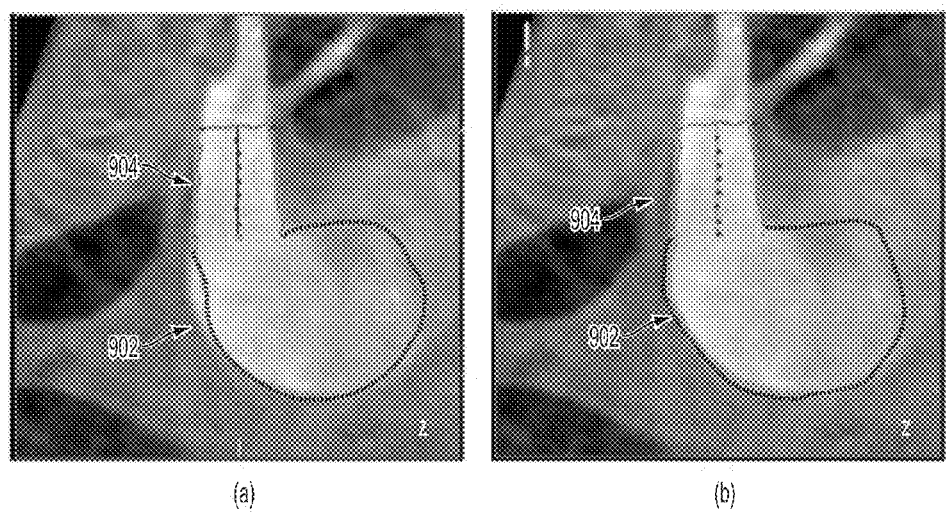
FIG. 9 illustrates refinement of the segmentation of ostia region of the left superior pulmonary vein using region growing.

Returning to FIG. 6, at step 608, region growing is performed on the volume mask to refine the segmentation of the ostia regions. The initial ostia region is labeled with pure mesh operation by projecting the PV/appendage meshes onto the LA chamber. This initial segmentation is often not accurate enough, especially when the gap between the parts is large. Layer-by-layer region growing is performed on the volume mask using an adaptive threshold to refine the segmentation. In particular, the outer layer (i.e., boundary) is defined in the volume mask. If a voxel adjacent the outer layer has an intensity in original volume greater than the threshold, the voxel is included within the volume mask. The outer layer of the volume mask is then redefined with the boundary of the volume mask adjusted to include the voxels added to the volume mask. The region growing (dilation) can then be repeated on the redefined outer layer. Such layer-by-layer region growing can be performed for a number iterations or until no additional voxels are added to the volume mask. According to an advantageous embodiment, a conservative growing threshold is set (e.g., the 50th percentile of the initial ostia region intensity distribution) to include only very bright voxels. FIG. 9 illustrates refinement of the segmentation of ostia region of the LSPV using region growing. Image (a) of FIG. 9 show the initial segmentation of the ostia region between the LSVP 904 and the LA chamber 902 without region growing. Image (b) of FIG. 9 shows the segmentation of the ostia region between the LSVP 904 and the LA chamber 902 after layer-by-layer region growing is performed.

Figure 10:
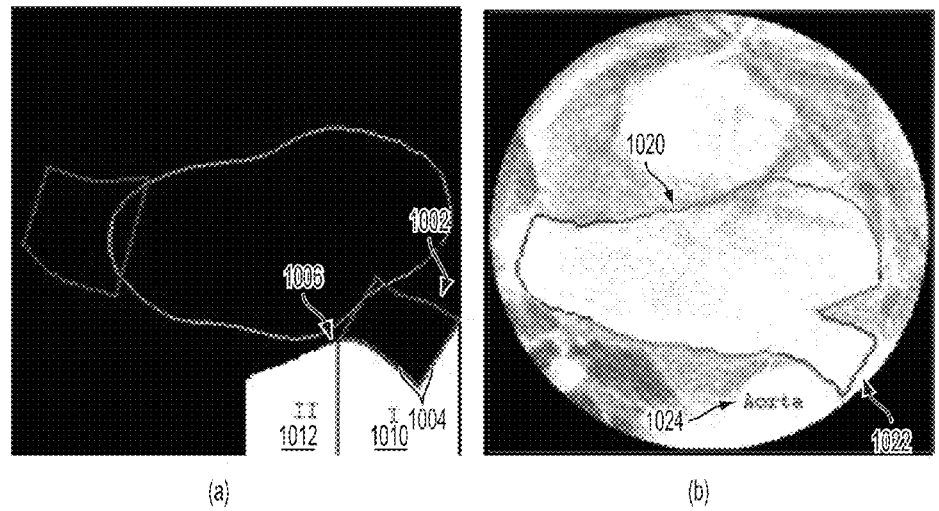
FIG. 10 illustrates a forbidden region around the LIPV to avoid leakage of region growing into the descending aorta.

Due to the motion blur in non-electrocardiography-gated C-arm CT reconstruction, a thin boundary between different tissues is often completely missing. For example, the left inferior PV (LIPV) is often close to the descending aorta, which is also filled with contrast agent, as shown in image (b) of FIG. 10. In this case, without special processing, region growing is likely to leak into the descending aorta. To prevent leakage, a forbidden region for region growing is explicitly labeled. FIG. 10 illustrates a forbidden region around the LIPV to avoid leakage of region growing into the descending aorta. In order to define the forbidden region, on each volume slice it is determined if the LIPV mesh intersects with this slice. As illustrated in image (a) of FIG. 10, if there is an intersection with the LIPV mesh 1002 on the slice, the lower contour 1004 of the mesh intersection is extracted and all voxels below the extracted contour 1004 are labeled as a first forbidden region (Region I) 1010. The left-most mesh intersection point 1006 is also extended by a predetermined amount to include a second forbidden region (Region II) 1012. The term "forbidden region" is used generally to refer to both of the first and second forbidden regions. Using the forbidden region, the descending aorta is successfully excluded from the region growing segmentation. Image (b) of FIG. 10 shows a final segmentation result 1020 after region growing. As shown in image (b) of FIG. 10, the segmentation of the LIPV 1022 does not leak into the aorta 1024.

Returning to FIG. 6, at step 610, a smooth mesh is fit to each ostia region. Due to the severe noise in C-arm CT volumes, the resulting boundary after region growing may be uneven and resemble a zig-zag pattern. On very rare cases, the resulting boundary may leak to another neighboring high-contrast object (e.g., the trans-esophagus echocardiographic (TEE) probe). To fix these issues, a smooth mesh is fit to each ostia region. The mesh for each ostia region is initialized as a tube. The proximal ring of a PV (or appendage) is extended towards the chamber. The surface between the original proximal ring and the extended ring is then triangulate to generate an initial mesh for the ostia region. Each mesh point is moved along the surface normal to a first transition from a masked voxel to background. Many leaked voxels are already excluded from the adjusted mesh. However, the resulting mesh is not smooth and it may still include leakage. Shrinking the mesh points along the surface normal then searches for an optimal smooth mesh.

The smoothness of a surface S can be measured by the sum of squares of derivative as:

$$SM(S) = \int \|S\nabla\|^2 \, ds. \tag{4}$$

A smaller SM represents a smoother surface. In practice, a discrete surface (e.g., a polyhedral surface) is often used to represent the boundary of a 3D object. Embodiments of the present invention represent a polyhedral surface as a graph $S=\{V,F\}$, where V is an array of vertices and F is an array of faces. Triangulated surfaces are the most common, where all faces are triangles, but the present invention is not limited thereto. For each vertex $V_i$ on the surface, a neighborhood $N_i$ can be defined. For example, a first order neighborhood can be used in which vertex j is a neighbor of vertex i if they are on the same face. The smoothness around a vertex can be defined as:

$$\nabla V_i = \sum_{j \in N_i} w_{ij}(V_j - V_i), \tag{5}$$

where the weights $w_{ij}$ are positive numbers that add up to one for each vertex:

$$\sum_{j \in N_i} w_{ij} = 1. \tag{6}$$

Accordingly, Equation (5) can be expressed as:

$$\nabla V_i = V_i - \sum_{j \in N_i} w_{ij} V_j. \tag{7}$$

In this form, the meaning of this smoothness measurement is clear. A vertex on an extremely smooth surface (e.g., a plane) can be represented as a weighted average of its neighbors, therefore with zero $\nabla V_i$. The weights may be chosen in many different ways taking into consideration of the neighborhoods. One possible way is to set $w_{ij}$ to be uniform:

$$w_{ij} = \frac{1}{\# N_i}, \quad (8)$$

where $\#N_i$ is the number of neighbors for vertex i. Given Equation (5), the smoothness of the whole surface is:

$$SM(S) = \sum_i \|V_i\|_{\overline{V}}^2. \quad (9)$$

It is desirable to adjust the mesh for each ostia region to generate a smooth surface by minimizing Equation (9). Since there is too many degrees freedom to adjust a mesh, the adjustment of each vertex of the mesh is only permitted along the normal direction $$V'_i = V_i \delta_i + N_i, \quad (10)$$

where $\delta_i$ is a scalar and $N_i$ is the surface normal at vertex i. The adjustment of each mesh can be further limited by enforcing the following constraints:

$$l_i \leq \delta_i \leq u_i, \quad (11)$$

where $l_i$ and $u_i$ are lower and upper bounds, respectively, for vertex i. For example, in a possible implementation of the present application, the constraint $\delta_i \leq 0$ can be enforced to guarantee that the mesh is completely embedded inside the masked ostia region. (It should be noted that the surface normal is pointing outside of the mesh.)

It is also desirable to achieve a trade-off between smoothness and the amount of adjustment. According to an advantageous embodiment, the final optimization problem for fitting a smooth mesh to each ostia region is:

$$\min F = \sum_i \left\| \sum_{j \in N_i} w_{ij}(V'_j \ V'_i) \right\|^2 + \alpha \sum_i \delta_i^2, \quad (12)$$

subject to the bound constraint of $\delta_i \leq 0$. Here, $\alpha \geq 0$ is a scalar for the above trade-off. This optimization problem is a classical quadratic programming problem. It can be proven that the objective function defined in Equation (12) is a strictly convex function for $\alpha > 0$. Therefore the minimization of the objective function will result in a unique global optimal solution. For a strictly convex quadratic programming problem, there are many well known algorithms for minimizing the objective function. With a bound constraint as described above, a more efficient and specialized method can be used to minimize the objective function, as described in More et al., "On the Solutions of Large Quadratic Programming Problems with Bound Constraints", *SIAM J. Optimization*, 1(1): 93-113, 1991.

Figure 11:
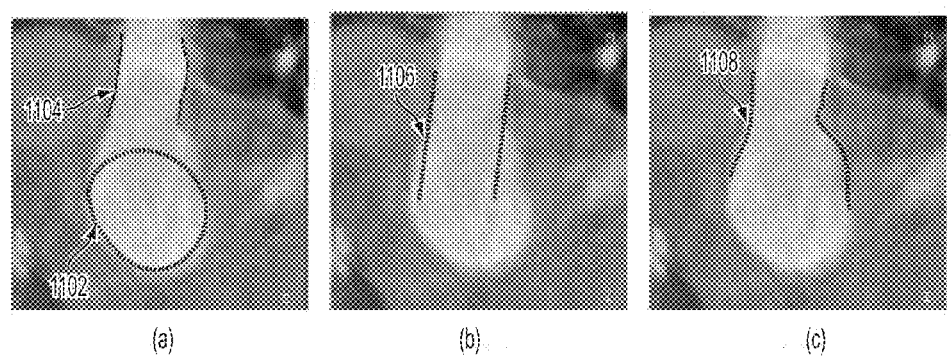
FIG. 11 illustrates fitting an optimal smooth mesh to the left inferior pulmonary vein ostia region.
Figure 12:
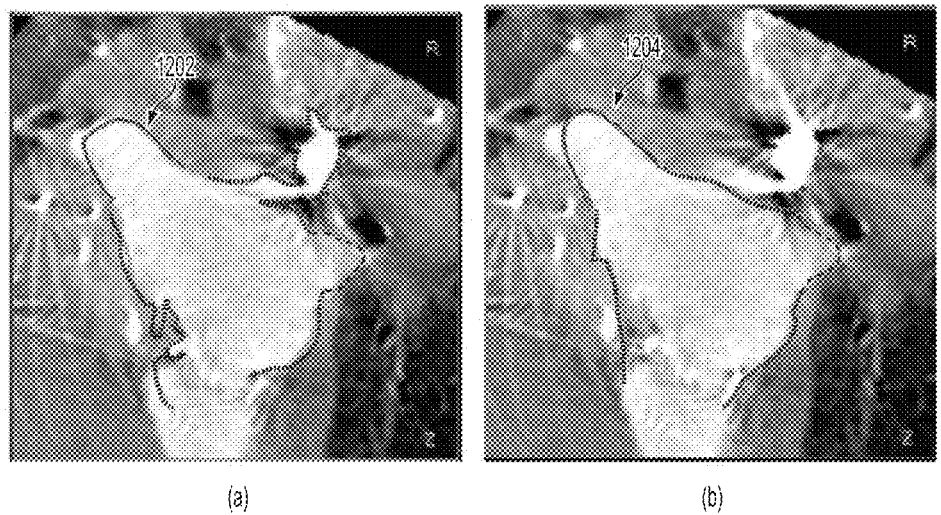
FIG. 12 illustrates an exemplary segmentation result in which leakage is prevented in the final segmentation.

FIG. 11 illustrates fitting an optimal smooth mesh to the left inferior PV (LIPV) ostia region. Image (a) of FIG. 11 shows separate part meshes for the LA chamber 1102 and the LIPV 1104. Image (b) shows the initial tubular mesh 1106 of the LIPV ostia region. Image (c) shows the optimal smooth mesh 1108 fit to the LIPV ostia region. After fitting an optimal smooth mesh to each ostia region, a smooth mesh is achieved in the final segmentation, and at the same time leakage is prevented. FIG. 12 illustrates an example in which leakage is prevented in the final segmentation. Image (a) of FIG. 12 shows a segmentation result 1202 after region growing and image (b) shows a segmentation result 1204 achieved by enforcing smoothness of the ostia regions. As shown in FIG. 12, the segmentation result 1204 of image (b) avoids the leakage prevalent in the segmentation result 1202 of image (a).

Returning to FIG. 6, at step 612, a consolidated mesh is generated from the volume mask. In particular, a new mesh is generated from the volume mask using the well-known marching cubes algorithm. The consolidated mesh is generated based on the boundaries of the LA chamber, PVs, appendage, and ostia regions in the volume mask. FIG. 12.

At step 614, the mesh points in the ostia regions are labeled. While it is possible to label the ostia regions as part of the LA chamber, this results in the boundaries between the PVs (or the appendage) and the chamber being labeled incorrectly. According to an embodiment of the present invention, the final mesh part labeling is refined using an optimization based approach.

Figure 13:
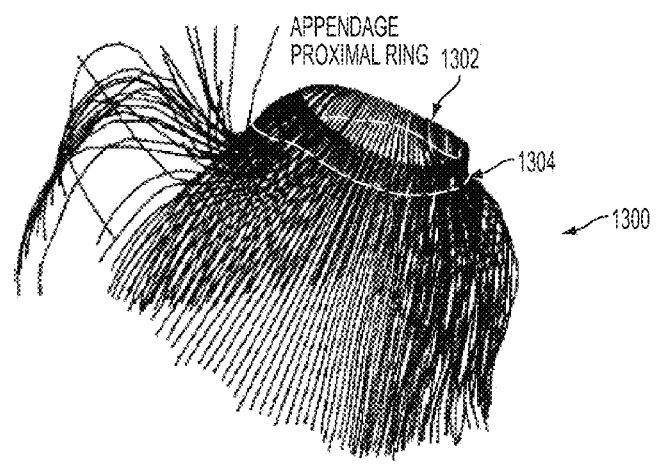
FIG. 13 illustrates detection of the optimal boundary between the appendage and the LA chamber.

Typically, the boundary between different parts has high surface curvature on the mesh. However, in some cases, the connection can be smooth, and therefore, the exact boundary around those regions must be constrained by the neighboring regions with high curvature. In an embodiment of the present invention, an optimization approach can be used to search for the part boundary between a PV or appendage and the LA chamber. First, the proximal ring of a PV (or appendage) is densely resampled to a predetermined resolution (e.g., 5 mm). Suppose the proximal ring center is C. Given a proximal ring point $P_i$, a plane is determined that is perpendicular to the proximal ring and pass through $P_i$ and C. Starting from point $P_i$, the mask boundary (the boundary between foreground voxels and the background) on the plane is traced. The tracing stops if a masked voxel of another PV (or appendage) or the total traced length is more than a predetermined value (e.g., 60 mm). The traced contour is then uniformly resampled to a high resolution (e.g., 0.25 mm). FIG. 13 illustrates detection of the optimal boundary between the appendage and the LA chamber. As shown in FIG. 13 contours 1300 are traced from the appendage proximal ring 1302. The tracing procedure generates a set of points $Q_i^j$. Here, $Q_i^j$ means the $j^{th}$ point of the $i^{th}$ contour and $Q_i^0 = P_i$. A smooth part boundary B with the maximum sum of curvature is then searched for:

$$B = (Q_0^{J(0)}, Q_1^{J(1)}, \ldots, Q_{n-1}^{J(n-1)}) = \underset{J(0),J(1),\ldots,J(n-1)}{\operatorname{argmax}} \sum_{i=0}^{n-1} C(Q_i^{J(i)}). \quad (13)$$

Here, $C(Q_i^j)$ is the curvature at point $Q_i^j$, which is defined as:

$$C(Q_i^j) = \|(Q_i^{j+1} - Q_i^j) - (Q_i^j - Q_i^{j-1})\| = \|2Q_i^j - Q_i^{j-1} - Q_i^{j+1}\|. \quad (14)$$

As a second order derivative of a contour, curvature estimation is error prone, therefore, for some datasets, the final part boundary B may be stuck in a position a bit away from the chamber. To achieve a more robust result, a small amount of bias, $\|N \cdot (Q_i^j - Q_i^0)\|$, can be added into the cost function to push the part boundary toward the chamber. Here, N is the normal of the proximal ring and $\|N \cdot (Q_i^j - Q_i^0)\|$ is the dot product of the vectors N and $Q_i^j - Q_i^0$, therefore measuring the distance from $Q_i^j$ to the proximal ring plane. The smoothness of the part boundary is enforced by constraining the distance of neighboring $Q_i^{J(i)}$ and $Q_i^{J(i+1)}$ to $$|J(i) - J(i+1)| \leq 1. \quad (15)$$

The part boundary should form a closed contour, therefore:

$$\|J(n-1)-J(0)\| \le 1. \quad (16)$$

The final optimization problem can be formalized as:

$$B = (Q_0^{J(0)}, Q_1^{J(1)}, \square, Q_{n-1}^{J(n-1)}) = \quad (17)$$

$$\underset{J(0),J(1),\square,J(n-1)}{\mathrm{argmax}} \sum_{i=0}^{n-1} C(Q_i^{J(i)}) + w \|N \cdot (Q_i^{J(i)} - Q_i^0)\|,$$

subject to the constraint Equations (15) and (16). Here, w is a weight adjusting the bias toward a boundary close to the chamber. In an exemplary implementation, w=0.001, but the present invention is not limited thereto. The optimal part boundary can be solved efficiently using a dynamic programming algorithm to achieve a global optimal solution. In FIG. 13, contour 1304 is the optimal boundary detected between the left atrial appendage and the chamber.

Figure 14:
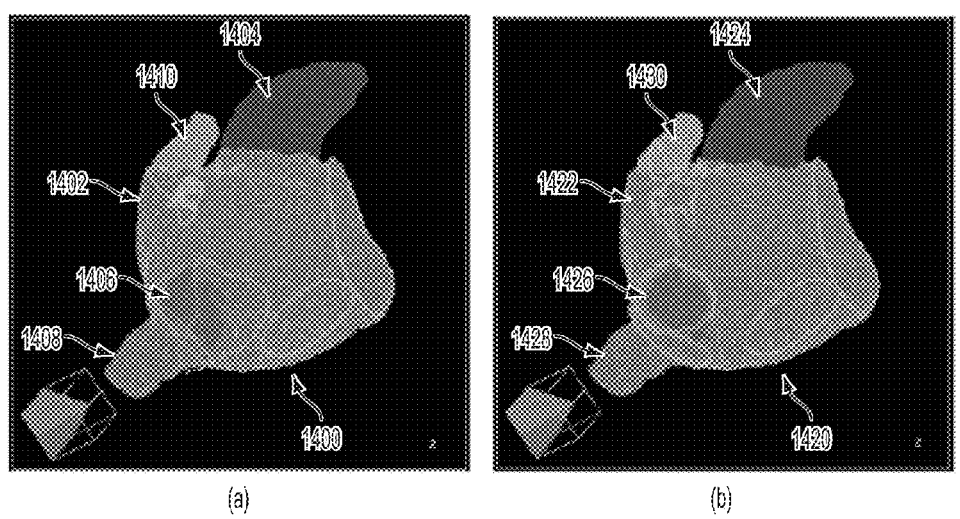
FIG. 14 illustrates segmentation results for a consolidated mesh before and after mesh part relabeling.

Once the optimal boundaries are detected between each PV and the LA chamber and between the appendage and the LA chamber, the mesh parts are relabeled based on the detected optimal boundaries. FIG. 14 illustrates segmentation results for the consolidated mesh before and after mesh part relabeling. Image (a) of FIG. 14 shows the consolidated mesh 1400 before mesh part relabeling, including mesh parts for the LA chamber body 1402, appendage 1404, left inferior PV (not shown), the left superior PV 1410, the right inferior PV 1408, and the right superior PV 1406. Image (b) of FIG. 14 shows the consolidated mesh 1420 after mesh part relabeling, including mesh parts for the LA chamber body 1422, appendage 1424, left inferior PV (not shown), the left superior PV 1430, the right inferior PV 1428, and the right superior PV 1426.

Returning to FIG. 2, at step 208, the LA segmentation results are output. For example, the consolidated mesh may be output by displaying the consolidated mesh on a display device of a computer system or by overlaying the consolidated mesh onto a 2D fluoroscopic image for guidance of a catheter ablation procedure (as shown in image (c) of FIG. 1). The segmentation results may also be output by storing the segmentation results on a storage or memory of a computer system.

Figure 15:
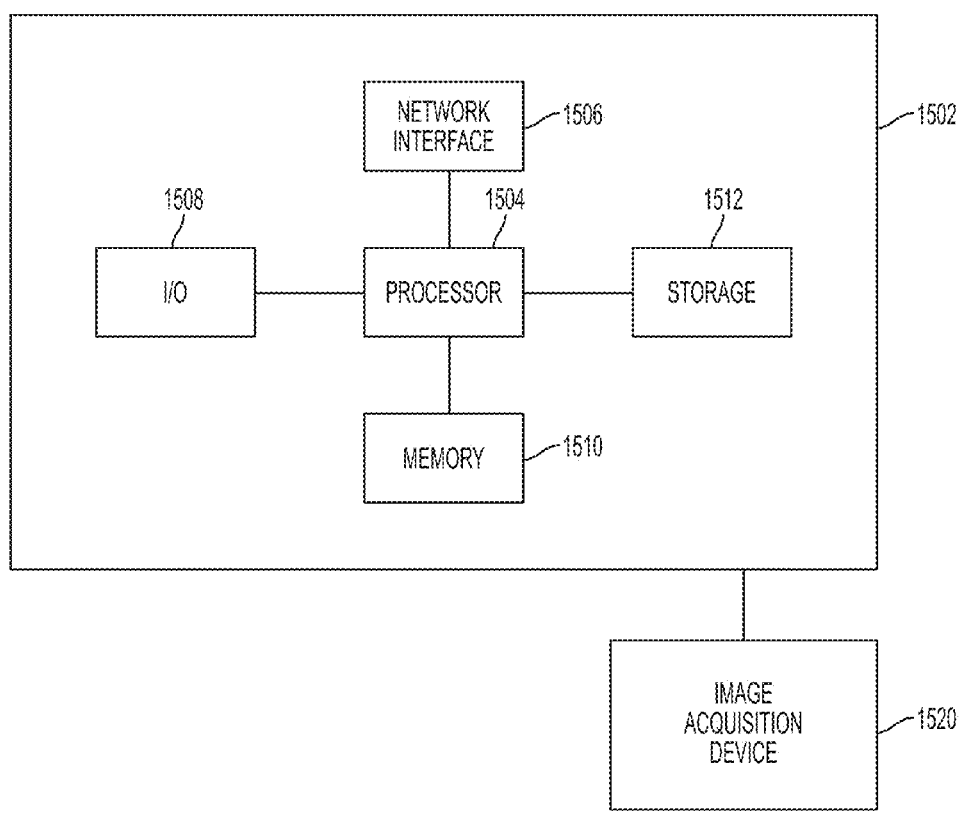
FIG. 15 is a high level block diagram of a computer capable of implementing the present invention.

The above-described methods for multi-part left atrium segmentation may be implemented on a computer using well-known computer processors, memory units, storage devices, computer software, and other components. A high level block diagram of such a computer is illustrated in FIG. 15. Computer 1502 contains a processor 1504 which controls the overall operation of the computer 1502 by executing computer program instructions which define such operation. The computer program instructions may be stored in a storage device 1512, or other computer readable medium (e.g., magnetic disk, CD ROM, etc.) and loaded into memory 1510 when execution of the computer program instructions is desired. Thus, the steps of the methods of FIGS. 2, 3, 4, and 6 may be defined by the computer program instructions stored in the memory 1510 and/or storage 1512 and controlled by the processor 1504 executing the computer program instructions. An image acquisition device 1520, such as a C-arm image acquisition device, can be connected to the computer 1502 to input images to the computer 1502. It is possible to implement the image acquisition device 1520 and the computer 1502 as one device. It is also possible that the image acquisition device 1520 and the computer 1502 communicate wirelessly through a network. The computer 1502 also includes one or more network interfaces 1506 for communicating with other devices via a network. The computer 1502 also includes other input/output devices 1508 that enable user interaction with the computer 1502 (e.g., display, keyboard, mouse, speakers, buttons, etc.). One skilled in the art will recognize that an implementation of an actual computer could contain other components as well, and that FIG. 15 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of segmenting a left atrium (LA) in a 3D volume comprising:
    segmenting an LA chamber body mesh, an appendage mesh, and a plurality of pulmonary vein (PV) meshes in the 3D volume;
    generating a volume mask from the LA chamber mesh, the appendage mesh, and the plurality of PV meshes;
    refining each of a plurality of ostia regions in the volume mask using region growing, wherein the plurality of ostia regions includes an appendage ostia region and a plurality of PV ostia regions;
    fitting a smooth mesh to each of the plurality of ostia regions; and
    generating a consolidated LA mesh from the volume mask including the smooth mesh fit to each of the plurality of ostia regions.

2. The method of claim 1, wherein the plurality of PV meshes includes a left inferior PV mesh, a left superior PV mesh, a right inferior PV mesh, and a right superior PV mesh, and the plurality of PV ostia regions includes a respective PV ostia region corresponding to each of the plurality of PV meshes.

3. The method of claim 1, wherein the step of generating a volume mask from the LA chamber mesh, the appendage mesh, and the plurality of PV meshes comprises:
    connecting the LA chamber mesh with the appendage mesh and each of the plurality of PV meshes by projecting a respective proximal ring of the appendage mesh and each of the plurality of PV meshes to the LA chamber mesh, resulting in a connected set of meshes; and
    converting the connected set of meshes to the volume mask, wherein the plurality of ostia regions are defined in the volume mask by projected portions of the appendage mesh and each of the plurality of PV meshes resulting from projecting the respective proximal ring of the appendage mesh and each of the plurality of PV meshes to the LA chamber mesh.

4. The method of claim 1, further comprising:
    performing erosion on the LA chamber body and the plurality of ostia regions in the volume mask to remove dark voxels from the LA chamber body and the plurality of ostia regions in the volume mask.

5. The method of claim 4, wherein the step of performing erosion on the LA chamber body and the plurality of ostia regions in the volume mask to remove dark voxels from the LA chamber body and the plurality of ostia regions in the volume mask comprises:

(a) identifying an outer layer of voxels of the LA chamber body and ostia regions;

(b) comparing an intensity of each voxel in the outer layer of voxels to a threshold, wherein the threshold is automatically determined based on voxel intensities in the ostia regions; and (c) if the intensity of a voxel in the outer layer is less than the threshold, setting the voxel as a background voxel; and (d) repeating steps (a)-(c) to perform layer-by-layer erosion of the LA chamber body and ostia regions.

6. The method of claim 1, wherein the step of refining each of a plurality of ostia regions in the volume mask using region growing comprises:

(a) identifying adjacent voxels to an outer layer of voxels of the volume mask;

(b) comparing an intensity of each of the adjacent voxel to a threshold, wherein the threshold is automatically determined based on voxel intensities in the ostia regions; and (c) if the intensity of an adjacent voxel is greater than the threshold, including the adjacent voxel in the volume mask; and (d) repeating steps (a)-(c) to perform layer-by-layer region growing of the volume mask.

7. The method of claim 1, wherein the step of refining each of a plurality of ostia regions in the volume mask using region growing comprises:

generating a forbidden region for region growing in the volume mask; and performing region growing on the volume mask constrained based on the forbidden region.

8. The method of claim 7, wherein the step of generating a forbidden region for region growing in the volume mask comprises:

for each of a plurality of volume slices that intersect with a left inferior PV mesh:

extracting a lower contour of the left inferior PV mesh on the volume slice;

labeling voxels below the lower contour of the left inferior PV mesh as a forbidden region; and extending the forbidden region based on a left-most intersection point of the left interior PV mesh and the volume slice.

9. The method of claim 1, wherein the step of fitting a smooth mesh to each of the plurality of ostia regions comprises:

initializing a respective mesh as a tube for each of the plurality of ostia regions;

moving each of a plurality of mesh points of each respective mesh along a surface normal to a first transition from a mask voxel to background; and generating a smooth mesh for each respective mesh by determining an adjustment of each of the plurality of mesh points of each respective mesh along the surface normal to shrink the respective mesh using an objective function based on smoothness and a total amount of mesh point adjustment.

10. The method of claim 1, wherein the step of generating a consolidated LA mesh from the volume mask including the smooth mesh fit to each of the plurality of ostia regions comprises:

generating the consolidated LA mesh from the volume mask including the smooth mesh fit to each of the plurality of ostia regions using a marching cubes algorithm.

11. The method of claim 1, further comprising:

detecting a respective part boundary in the consolidated mesh for each of the plurality of ostia regions; and re-labeling portions of the consolidated mesh in each of the plurality of ostia regions based on each detected part boundary.

12. The method of claim 11, wherein the step of detecting a respective part boundary in the consolidated mesh for each of the plurality of ostia regions comprises, for each of the appendage mesh and the plurality of PV meshes:

determining a plurality proximal ring cutting planes, each perpendicular to a proximal ring plane and passing through a respective point on the proximal ring and a proximal ring center;

generating a set of contours by tracing the volume mask boundary in each of the plurality of proximal ring cutting planes from the respective point on the proximal ring, resulting in a set of points $Q_i^j$, where $Q_i^j$ denotes the $j^{th}$ point of the $i^{th}$ contour;

detecting a part boundary B by optimizing the objective function:

$$B = (Q_0^{J(0)}, Q_1^{J(1)}, \square, Q_{n-1}^{J(n-1)}) = \underset{J(0),J(1),\square,J(n-1)}{\operatorname{argmax}} \sum_{i=0}^{n-1} C(Q_i^{J(i)}) + w\|N \cdot (Q_i^{J(i)} - Q_i^0)\|,$$

subject to the constraints:

$\|J(i)-J(i+1)\| \le 1$ and $\|J(n-1)-J(0)\| \le 1$, wherein $C(Q_i^j)$ is the curvature at point $Q_i^j$, N is the normal of the proximal ring and $\|N \cdot (Q_i^j - Q_i^0)\|$ is the dot product of the vectors N and $Q_i^j - Q_i^0$, and w is a weight adjusting a bias toward a boundary close to the LA chamber body.

13. An apparatus of segmenting a left atrium (LA) in a 3D volume comprising:

means for segmenting an LA chamber body mesh, an appendage mesh, and a plurality of pulmonary vein (PV) meshes in the 3D volume;

means for generating a volume mask from the LA chamber mesh, the appendage mesh, and the plurality of PV meshes;

means for refining each of a plurality of ostia regions in the volume mask using region growing, wherein the plurality of ostia regions includes an appendage ostia region and a plurality of PV ostia regions;

means for fitting a smooth mesh to each of the plurality of ostia regions; and means for generating a consolidated LA mesh from the volume mask including the smooth mesh fit to each of the plurality of ostia regions.

14. The apparatus of claim 13, wherein the plurality of PV meshes includes a left inferior PV mesh, a left superior PV mesh, a right inferior PV mesh, and a right superior PV mesh, and the plurality of PV ostia regions includes a respective PV ostia region corresponding to each of the plurality of PV meshes.

15. The apparatus of claim 13, wherein the means for generating a volume mask from the LA chamber mesh, the appendage mesh, and the plurality of PV meshes comprises:

means for connecting the LA chamber mesh with the appendage mesh and each of the plurality of PV meshes by projecting a respective proximal ring of the appendage mesh and each of the plurality of PV meshes to the LA chamber mesh, resulting in a connected set of meshes; and means for converting the connected set of meshes to the volume mask, wherein the plurality of ostia regions are defined in the volume mask by projected portions of the appendage mesh and each of the plurality of PV meshes resulting from projecting the respective proximal ring of the appendage mesh and each of the plurality of PV meshes to the LA chamber mesh.

16. The apparatus of claim 13, further comprising:
means for performing erosion on the LA chamber body and the plurality of ostia regions in the volume mask to remove dark voxels from the LA chamber body and the plurality of ostia regions in the volume mask.

17. The apparatus of claim 13, wherein the means for refining each of a plurality of ostia regions in the volume mask using region growing comprises:
means for generating a forbidden region for region growing in the volume mask.

18. The apparatus of claim 13, further comprising:
means for detecting a respective part boundary in the consolidated mesh for each of the plurality of ostia regions.

19. A non-transitory computer readable medium storing computer program instructions for segmenting a left atrium (LA) in a 3D volume, which when executed on a processor cause the processor to perform operations comprising:
segmenting an LA chamber body mesh, an appendage mesh, and a plurality of pulmonary vein (PV) meshes in the 3D volume;
generating a volume mask from the LA chamber mesh, the appendage mesh, and the plurality of PV meshes;
refining each of a plurality of ostia regions in the volume mask using region growing, wherein the plurality of ostia regions includes an appendage ostia region and a plurality of PV ostia regions;
fitting a smooth mesh to each of the plurality of ostia regions; and
generating a consolidated LA mesh from the volume mask including the smooth mesh fit to each of the plurality of ostia regions.

20. The non-transitory computer readable medium of claim 19, wherein the plurality of PV meshes includes a left inferior PV mesh, a left superior PV mesh, a right inferior PV mesh, and a right superior PV mesh, and the plurality of PV ostia regions includes a respective PV ostia region corresponding to each of the plurality of PV meshes.

21. The non-transitory computer readable medium of claim 19, wherein the operation of generating a volume mask from the LA chamber mesh, the appendage mesh, and the plurality of PV meshes comprises:
connecting the LA chamber mesh with the appendage mesh and each of the plurality of PV meshes by projecting a respective proximal ring of the appendage mesh and each of the plurality of PV meshes to the LA chamber mesh, resulting in a connected set of meshes; and
converting the connected set of meshes to the volume mask, wherein the plurality of ostia regions are defined in the volume mask by projected portions of the appendage mesh and each of the plurality of PV meshes resulting from projecting the respective proximal ring of the appendage mesh and each of the plurality of PV meshes to the LA chamber mesh.

22. The non-transitory computer readable medium of claim 19, wherein the operations further comprise:
performing erosion on the LA chamber body and the plurality of ostia regions in the volume mask to remove dark voxels from the LA chamber body and the plurality of ostia regions in the volume mask.

23. The non-transitory computer readable medium of claim 22, wherein the operation of performing erosion on the LA chamber body and the plurality of ostia regions in the volume mask to remove dark voxels from the LA chamber body and the plurality of ostia regions in the volume mask comprises:
(a) identifying an outer layer of voxels of the LA chamber body and ostia regions;
(b) comparing an intensity of each voxel in the outer layer of voxels to a threshold, wherein the threshold is automatically determined based on voxel intensities in the ostia regions; and
(c) if the intensity of a voxel in the outer layer is less than the threshold, setting the voxel as a background voxel; and
(d) repeating steps (a)-(c) to perform layer-by-layer erosion of the LA chamber body and ostia regions.

24. The non-transitory computer readable medium of claim 19, wherein the operation of refining each of a plurality of ostia regions in the volume mask using region growing comprises:
(a) identifying adjacent voxels to an outer layer of voxels of the volume mask;
(b) comparing an intensity of each of the adjacent voxel to a threshold, wherein the threshold is automatically determined based on voxel intensities in the ostia regions; and
(c) if the intensity of an adjacent voxel is greater than the threshold, including the adjacent voxel in the volume mask; and
(d) repeating steps (a)-(c) to perform layer-by-layer region growing of the volume mask.

25. The non-transitory computer readable medium of claim 19, wherein the operation of refining each of a plurality of ostia regions in the volume mask using region growing comprises:
generating a forbidden region for region growing in the volume mask; and
performing region growing on the volume mask constrained based on the forbidden region.

26. The non-transitory computer readable medium of claim 19, wherein the operation of fitting a smooth mesh to each of the plurality of ostia regions comprises:
initializing a respective mesh as a tube for each of the plurality of ostia regions;
moving each of a plurality of mesh points of each respective mesh along a surface normal to a first transition from a mask voxel to background; and
generating a smooth mesh for each respective mesh by determining an adjustment of each of the plurality of mesh points of each respective mesh along the surface normal to shrink the respective mesh using an objective function based on smoothness and a total amount of mesh point adjustment.

27. The non-transitory computer readable medium of claim 19, wherein the operations further comprise:
detecting a respective part boundary in the consolidated mesh for each of the plurality of ostia regions; and
re-labeling portions of the consolidated mesh in each of the plurality of ostia regions based on each detected part boundary.

28. The non-transitory computer readable medium of claim 27, wherein the operation of detecting a respective part boundary in the consolidated mesh for each of the plurality of ostia regions comprises, for each of the appendage mesh and the plurality of PV meshes:
- determining a plurality proximal ring cutting planes, each perpendicular to a proximal ring plane and passing through a respective point on the proximal ring and a proximal ring center;
- generating a set of contours by tracing the volume mask boundary in each of the plurality of proximal ring cutting planes from the respective point on the proximal ring, resulting in a set of points $Q_i^j$, where $Q_i^j$ denotes the $j^{th}$ point of the $i^{th}$ contour;
- detecting a part boundary B by optimizing the objective function:

$$B = (Q_0^{J(0)}, Q_1^{J(1)}, \square, Q_{n-1}^{J(n-1)}) = \operatorname*{argmax}_{J(0),J(1),\square,J(n-1)} \sum_{i=0}^{n-1} C(Q_i^{J(i)}) + w\|N \cdot (Q_i^{J(i)} - Q_i^0)\|,$$

subject to the constraints:

$$\|J(i)-J(i+1)\| \leq 1 \text{ and } \|J(n-1)-J(0)\| \leq 1,$$

wherein $C(Q_i^j)$ is the curvature at point $Q_i^j$, N is the normal of the proximal ring and $\|N \cdot (Q_i^j - Q_i^0)\|$ is the dot product of the vectors N and $Q_i^j - Q_i^0$, and w is a weight adjusting a bias toward a boundary close to the LA chamber body.

* * * * *